United States Patent
Veygman

(10) Patent No.: US 9,507,433 B1
(45) Date of Patent: *Nov. 29, 2016

(54) SYSTEM AND METHOD FOR DISCERNING COMPLEX GESTURES USING AN ARRAY OF OPTICAL SENSORS

(71) Applicant: Maxim Integrated Products, Inc., San Jose, CA (US)

(72) Inventor: Ilya K. Veygman, Palo Alto, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,983

(22) Filed: Nov. 2, 2015

Related U.S. Application Data

(63) Continuation of application No. 13/740,573, filed on Jan. 14, 2013, now Pat. No. 9,176,588.

(51) Int. Cl.
   *G06F 3/01* (2006.01)
(52) U.S. Cl.
   CPC .................................. *G06F 3/017* (2013.01)
(58) Field of Classification Search
   CPC ...... G06F 3/017; G06F 3/042; G06F 3/0421; G06F 3/04883; G06F 3/0304; G06F 3/0425; G06F 3/3231; G06F 2203/04108
   USPC .................. 345/156, 166, 173, 175; 715/863
   See application file for complete search history.

(56) References Cited

U.S. PATENT DOCUMENTS

| | | | |
|---|---|---|---|
| 8,180,114 B2 | 5/2012 | Nishihara | |
| 2009/0085864 A1* | 4/2009 | Kutliroff | A63F 13/10 345/156 |
| 2009/0278915 A1* | 11/2009 | Kramer | G06K 9/00375 348/48 |
| 2010/0026656 A1* | 2/2010 | Hotelling | G06F 3/044 345/174 |
| 2010/0050133 A1* | 2/2010 | Nishihara | G06F 3/0425 715/863 |
| 2010/0150399 A1 | 6/2010 | Svajda et al. | |
| 2010/0156804 A1* | 6/2010 | Young | G06F 3/0416 345/173 |
| 2011/0302538 A1* | 12/2011 | Vennelakanti | G06F 3/038 715/863 |
| 2012/0225719 A1* | 9/2012 | Nowozin | G06K 9/00342 463/36 |

* cited by examiner

*Primary Examiner* — Koosha Sharifi-Tafreshi
(74) *Attorney, Agent, or Firm* — Advent, LLP

(57) ABSTRACT

A method for gesture determination (e.g., discerning complex gestures) via an electronic system (e.g., a gesture sensing system) including an array of optical sensors is described herein. The method includes detecting a plurality of sub-gestures (e.g., simple gestures provided by a target located proximate to the system) via the array of optical sensors. The sensors generate signals based upon the detected (e.g., received) sub-gestures and transmit the signals to a processor of the gesture sensing system. The processor processes the signals to obtain data associated with the sub-gestures and analyzes the sub-gesture data to determine if the sub-gestures collectively constitute a gesture (e.g., complex gesture). When the analyzing indicates that the sub-gestures collectively constitute a complex gesture, the gesture sensing system detects the complex gesture.

16 Claims, 11 Drawing Sheets

| SENSOR 1 | SENSOR 2 | SENSOR 3 | SENSOR 4 |
|---|---|---|---|
| NO GESTURE | NO GESTURE | ↑ | ↑ |
| " | " | ↓ | ↑ |
| " | " | ↙ | ↑ |
| " | " | ↓ | ↖ |
| " | " | ↙ | ↖ |
| " | " | ↓ | ← |
| " | ↖ | ↙ | × |
| " | ↑ | ↓ | × |
| " | ← | → | × |
| ↙ | NO GESTURE | × | ↗ |
| ← | " | × | → |
| ↓ | " | × | ↑ |

FIG. 4A

| SENSOR 1 | SENSOR 2 | SENSOR 3 | SENSOR 4 |
|---|---|---|---|
| NO GESTURE | NO GESTURE | → | ↓ |
| " | " | ↗ | ↙ |
| " | " | ↗ | ↓ |
| " | " | ↑ | ↙ |
| ↑ | " | × | ↓ |
| ↑ | " | × | ↙ |
| ↗ | ↓ | × | ↓ |
| ↗ | ↓ | ↑ | ↙ |
| NO GESTURE | ↓ | ↖ | × |
| " | ↙ | ↖ | × |
| " | ↙ | ↑ | × |
| | | | × |

FIG. 4B

| SENSOR 1 | SENSOR 2 | SENSOR 3 | SENSOR 4 |
|---|---|---|---|
| NO GESTURE | NO GESTURE | ← | → |
| " | " | ← | ↘ |
| " | → | ← | ↗ |
| ← | → | ← | → |
| ↙ | → | ← | ↗ |

FIG. 4C

| SENSOR 1 | SENSOR 2 | SENSOR 3 | SENSOR 4 |
|---|---|---|---|
| NO GESTURE | NO GESTURE | → | ← |
| " | " | → | ↖ |
| " | ← | ↗ | ← |
| → | ↖ | → | ← |
| → | | ↘ | ← |

FIG. 4D

| DETECTED? | SENSOR 1 | SENSOR 2 | SENSOR 3 | SENSOR 4 |
|---|---|---|---|---|
| YES | NONE | NONE | ↑ | ↓ |
| NO | NONE | ↓ | ↑ | ↓ |
| NO | ↑ | NONE | ↑ | ↓ |
| NO | NONE | NONE | ↑ | NONE |
| NO | NONE | NONE | NONE | ↓ |

FIG. 4E

AN EXAMPLE OF A TREE-STYLE DEFINITION OF GESTURE SEQUENCES:

"3R" MEANS A RIGHT GESTURE ON SENSOR #3.

DEFINITIONS SEEN HERE:

1. 3R → 4L = PINCH
2. 3R → 4R = SWEEP RIGHT
3. 3R → 4R → 2U = "L" GESTURE
4. 4R → 3L = STRETCH
5. 4R → 2U = DISCARD

SOME THAT ARE NOT SHOWN DUE TO SPACE CONSTRAINTS:

- 4L → 3R = PINCH
- 3L → 4R = STRETCH
- 4L → 3L → 1U = "L" GESTURE (MIRRORED)
- 3L → 1U = DISCARD
- 4L → 3L = SWEEP LEFT

| | |
|---|---|
| PINCH: | START, 3-RIGHT, 4-LEFT, STOP |
| PINCH: | START, 4-LEFT, 3-RIGHT, STOP |
| PINCH: | START, 2-DOWNLEFT, 3-UPRIGHT, STOP |
| PINCH: | START, 3-UPRIGHT, 2-DOWNLEFT, STOP |
| STRETCH | START, 3-LEFT, 4-RIGHT, STOP |
| STRETCH | START, 4-RIGHT, 3-LEFT, STOP |
| STRETCH | START, 2-UPRIGHT, 3-DOWNLEFT, STOP |
| STRETCH | START, 3-DOWNLEFT, 2-UPRIGHT, STOP |

FIG. 5B

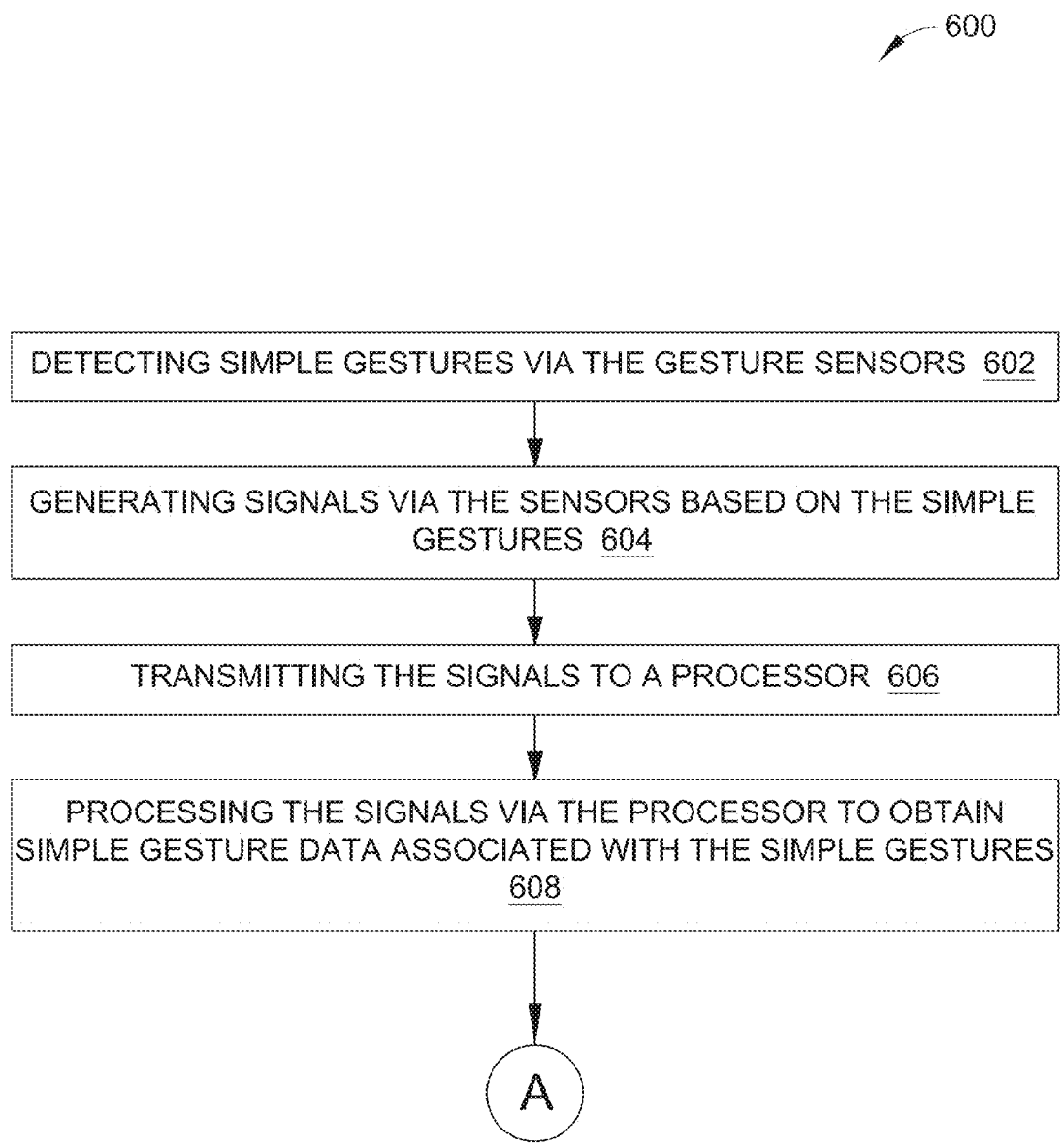

US 9,507,433 B1

SYSTEM AND METHOD FOR DISCERNING COMPLEX GESTURES USING AN ARRAY OF OPTICAL SENSORS

CROSS-REFERENCE TO RELATED APPLICATIONS

The present application is a continuation of U.S. patent application Ser. No. 13/740,573, entitled SYSTEM AND METHOD FOR DISCERNING COMPLEX GESTURES USING AN ARRAY OF OPTICAL SENSORS, by Ilya K. Veygman, filed Jan. 14, 2013, which is currently co-pending or is an application of which a currently co-pending application is entitled to the benefit of the filing date. U.S. patent application Ser. No. 13/740,573 is incorporated herein by reference in its entirety to the extent such subject matter is not inconsistent herewith.

BACKGROUND

A gesture sensor is a human interface device that enables the detection of physical movement by a user without the user actually touching the device within which the gesture sensor resides. The detected movements can be subsequently used as input commands for the device. In some applications, the device is programmed to recognize distinct non-contact hand motions, such as left-to-right, right-to-left, up-to-down, down-to-up, in-to-out and out-to-in hand motions. Gesture sensors have found popular use in hand-held devices, such as tablet computing devices and smartphones, and other portable devices, such as laptops. Gesture sensors are also being implemented in video game consoles that detect the motion of the video game player.

SUMMARY

A method for gesture determination (e.g., discerning complex gestures) via an electronic system (e.g., a gesture sensing system) including an array of optical sensors is described herein. The method includes detecting a plurality of sub-gestures (e.g., simple gestures provided by a target located proximate to the system) via the array of optical sensors. The sensors generate signals based upon the detected (e.g., received) sub-gestures and transmit the signals to a processor of the gesture sensing system. The processor processes the signals to obtain data associated with the sub-gestures and analyzes the sub-gesture data to determine if the sub-gestures collectively constitute a gesture (e.g., complex gesture). When the analyzing indicates that the sub-gestures collectively constitute a complex gesture, the gesture sensing system detects the complex gesture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

FIGS. 4A-4D depict example lookup tables which may be implemented by the gesture sensing system when analyzing sub-gesture data in accordance with exemplary embodiments of the present disclosure.

FIG. 4E depicts an example lookup table which may be implemented by the gesture sensing system, the lookup table providing possible combinations of sub-gestures which can be received by the sensors, and whether or not the combinations would result in the combination of sub-gestures being interpreted as a complex gesture (e.g., whether or not a complex gesture would be detected) by the gesture sensing system, in accordance with an exemplary embodiment of the present disclosure.

Figure 5A:
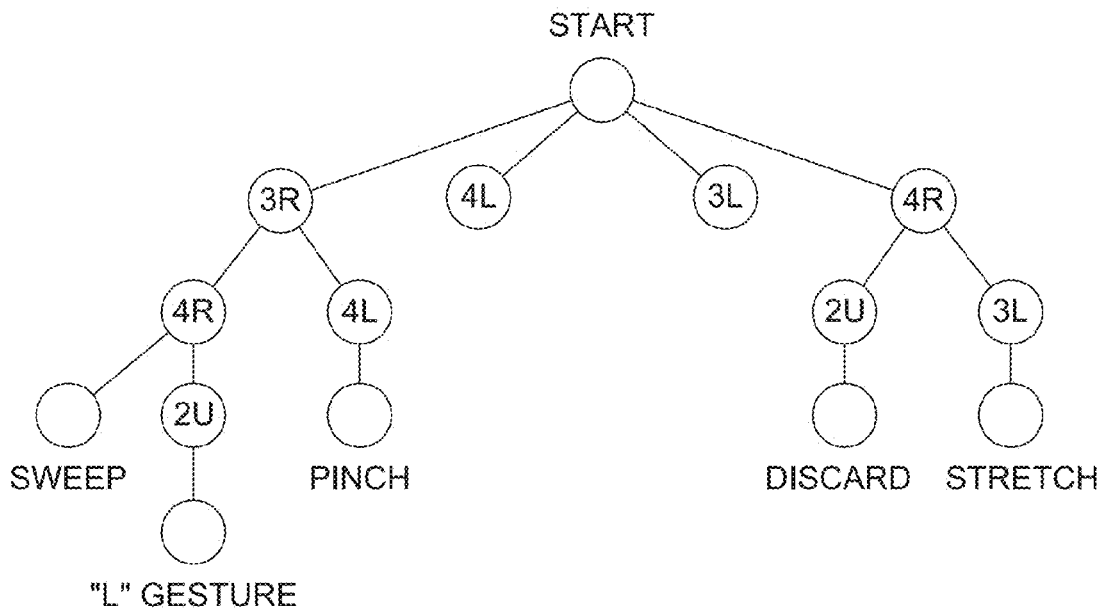

FIG. 5A depicts an example sequence tree which may be implemented by the gesture sensing system when analyzing sub-gesture data in accordance with an exemplary embodiment of the present disclosure.

FIG. 5B depicts valid combinations of sub-gestures which, if received by the gesture sensing system, may be interpreted as complex gestures (e.g., pinch gesture or a stretch gesture) in accordance with an exemplary embodiment of the present disclosure.

Figure 6B:
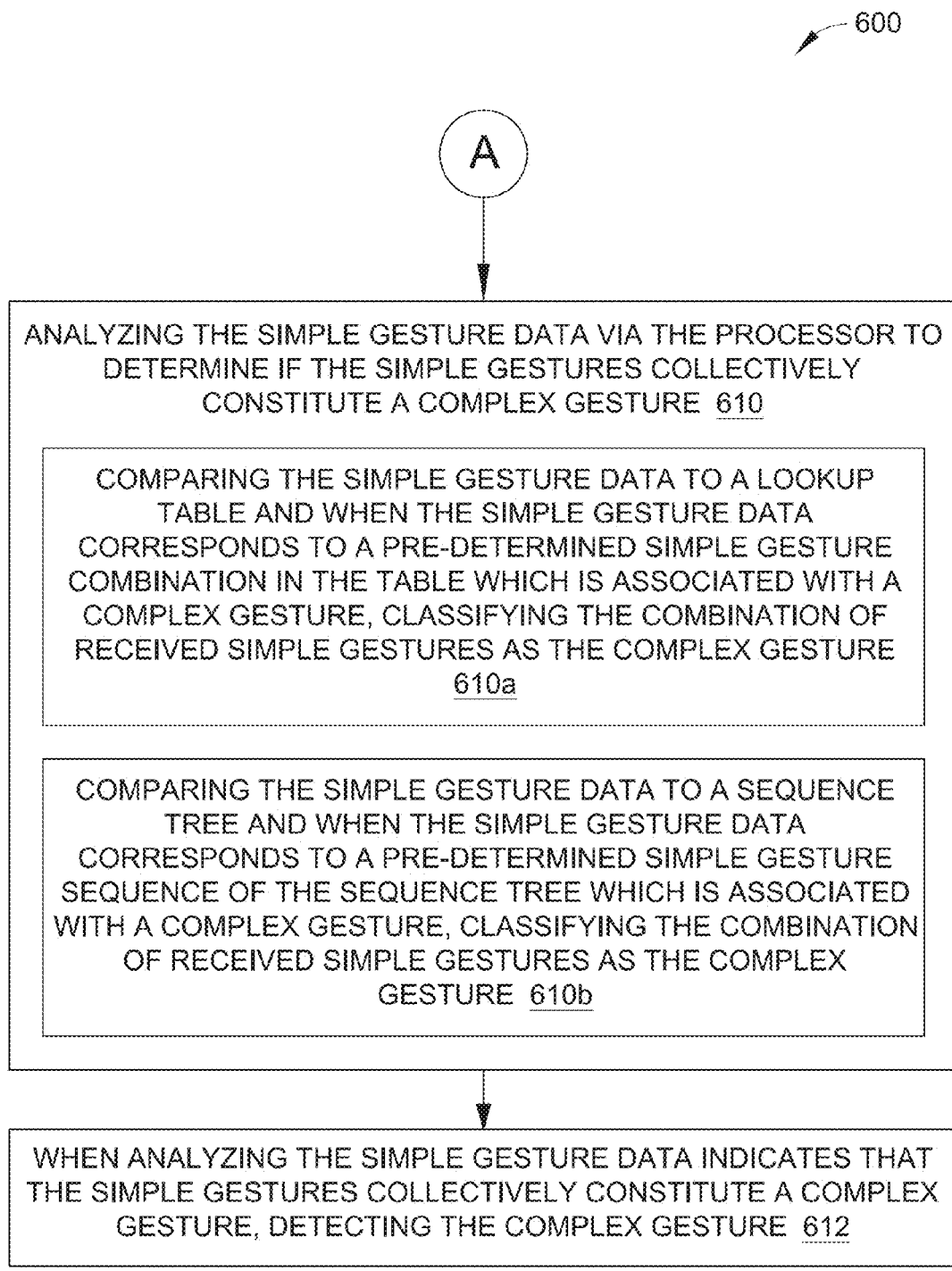

FIGS. 6A and 6B depict a flow diagram illustrating an example process for gesture determination via a gesture sensing system in accordance with an exemplary embodiment of the present disclosure.

DETAILED DESCRIPTION

Overview

Gesture sensing systems enable the detection of physical movement by a user without the user actually touching the gesture sensing system. To detect the physical movements (e.g., gestures), the gesture sensing system implements an optical sensor (e.g., gesture sensor) which is integrated with the gesture sensing system. The optical sensor facilitates the ability of the gesture sensing system to recognize simple gestures, such as left-to-right, right-to-left, up-to-down, down-to-up, in-to-out and out-to-in hand motions.

Described herein is a gesture sensing system (and a method of operation of the gesture sensing system) which is configured for detecting complex gestures (e.g., a stretch gesture, a pinch gesture) utilizing an array of optical sensors, each of which individually can only recognize simple gestures. A framework for processing and analyzing the collective data obtained via the array of optical sensors is implemented by the gesture sensing system, as described herein, to discern the complex gestures based upon the plurality of simple gestures obtained via the array of sensors.

Example Implementations

Figure 1:
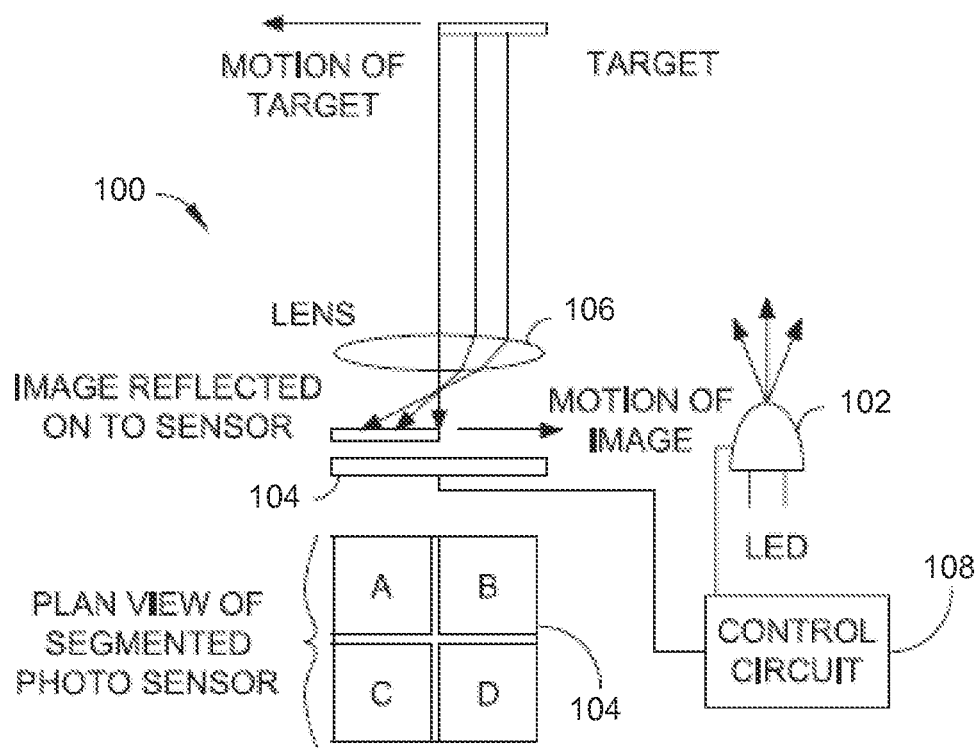
FIG. 1 is a conceptual block diagram of an optical gesture sensor in accordance with an exemplary embodiment of the present disclosure.

FIG. 1 (FIG. 1) is a conceptual block diagram of a gesture sensing device (e.g., a sensor, a gesture sensor, an optical sensor, an optical gesture sensor) in accordance with an exemplary embodiment of the present disclosure. In embodiments, the gesture sensing device 100 includes a single illumination source, represented as light-emitting diode (LED) 102. In embodiments, the gesture sensing device 100 includes a photo sensor (e.g., a segmented photo sensor) 104. In some embodiments, the photo sensor 104 is configured for sensing (e.g., detecting) only a specific wavelength or wavelengths of light, such as the wavelengths emitted by the illumination source 102. Such a configuration can be implemented through the use of a filter. In embodiments, the photo sensor 104 can be either a single sensor functionally partitioned into multiple segments or it can be an array of individual photo sensors. For example, a quad segmented photo sensor is functionally equivalent to four individual photo sensors arranged in a quad layout. As used herein, reference to a "segment" refers to either a partitioned segment within a single sensor or to an individual sensor in an array of sensors. FIG. 1 shows the photo sensor 104 as both on-edge (upper element labeled 104) and a plan view to show the different segments (lower element labeled 104).

In the exemplary configuration of FIG. 1, the photo sensor 104 includes four segments: segment A, segment B, segment C and segment D. Although a four-segment sensor (e.g., detector) is one implementation, it is understood that the number of segments can be increased to increase the resolution of the device 100. The signal processing electronics become increasingly more complex as the number of segments is increased. In embodiments, each of the segments of the photo sensor 104 are isolated from each other. In embodiments, the illumination source (e.g., LED) 102 is positioned (e.g., located) proximate to the segmented photo sensor 104. When a moving target passes proximate to the illumination source 102 and the photo sensor 104, light output from the illumination source 102 is reflected off the moving target and to the photo sensor 104. In embodiments, the gesture sensing device 100 includes an optical lens structure 106 configured for focusing light onto the photo sensor 104. In embodiments, the optical lens structure (e.g., focusing lens) 106 focuses reflected light from a moving target, such as a hand making a gesture, in the space above the photo sensor 104. In embodiments, only light that is within the field of view of the optical lens structure 106 is focused onto the photo sensor 104. Although shown as a single element in FIG. 1, the optical lens structure 106 may include any number of lenses and/or optical elements for directing light to the photo sensor 104. In embodiments, each segment of the photo sensor 104 outputs a segment signal to a control circuit 108 which is connected to the photo sensor 104. In embodiments, the control circuit 108 is configured for processing the segment signals received from the photo sensor 104.

In embodiments, the illumination source 102 is configured for being continuously or periodically energized (e.g., powered on) for illuminating the target. In embodiments, the light reflected from the target induces the segment signals on the photo sensor(s) 104. In embodiments, these segment signals are received and processed by the control circuit 108. In embodiments, the processed segment signals are stored in a buffer memory, the buffer memory being integrated with or separate from the control circuit 108. In embodiments, the control circuit 108 is configured for analyzing the stored signals (e.g., stored data) and determining if a valid gesture has been detected. In embodiments, the stored data may also be used so that the photo sensor 104 operates as a proximity detector. In embodiments, the same photo sensor 104 can be used with a different signal processing circuit so that the gesture sensing device 100 also functions as an ambient light sensor.

In embodiments, when the illumination source 102 is powered on, or flashes, the target is illuminated if the target is within a proximate space above the photo sensor 104. The moving target is conceptually illustrated in FIG. 1 as a flat reflector. The target reflection is imaged by the optical lens structure 106 onto the photo sensor 104. The example of FIG. 1 illustrates a right-to-left motion of the target. As the edge of the target moves through the center of the imaging zone, the focused image of the target edge moves across the photo sensor 104. Segments A and C respond first to the moving image, followed by segments B and D. In embodiments, the control circuit 108 is programmed to detect this sequence of events, and recognizes a right-to-left target motion. Similarly, a left-to-right target motion can be recognized, via the opposite sequence, and both up-to-down and down-to-up target motions can be recognized using the orthogonal set of signals. In-and-out target motion can be recognized by the control circuit 108 via sensing of the absolute amplitude of the sum of the four segments (A through D), which is also the proximity measurement. In some embodiments, filters are implemented on top of the photo sensor(s) 104 to filter out light having wavelengths that are different than the illumination source 102.

Figure 2:
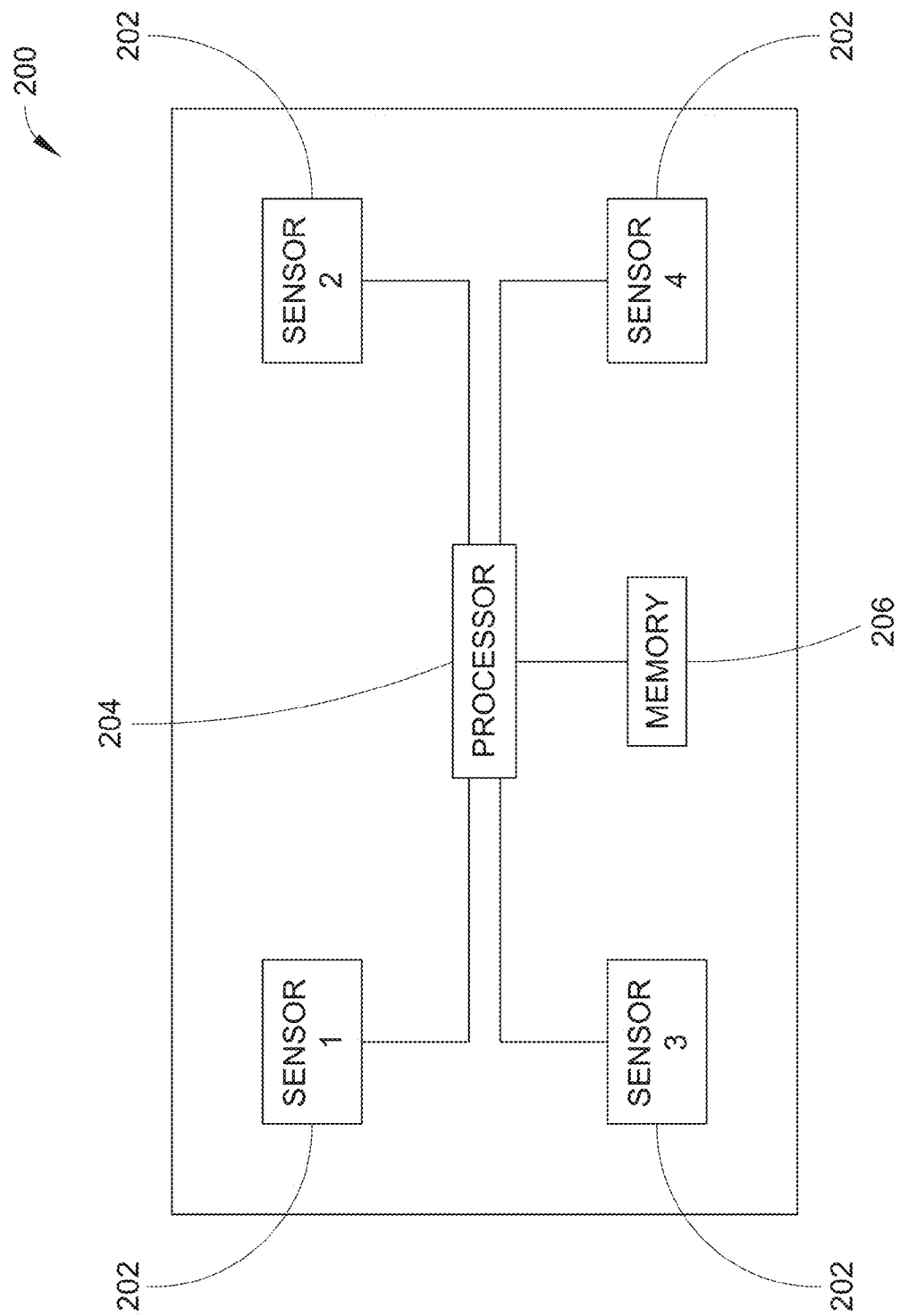
FIG. 2 is a conceptual block diagram of a gesture sensing system in accordance with an exemplary embodiment of the present disclosure.

FIG. 2 (FIG. 2) is a conceptual block diagram of a gesture sensing system 200 in accordance with an exemplary embodiment of the present disclosure. In embodiments, the system 200 is an electronic system (e.g., an electronic device). For instance, the system 200 can be a tablet computing device, a smartphone, a cell phone, a notebook computing device, a laptop computing device, or a video game console.

In embodiments, the gesture sensing system 200, is a multi-sensor system which implements a plurality (e.g., an array) of sensors (e.g., optical sensors, gesture sensors) 202. In embodiments, each sensor 202 implemented in the system 200 can be the single-LED optical gesture sensor (e.g., gesture sensor, gesture sensing device) 100 described above, and further described in the co-owned and co-pending U.S. Patent Application Pub. No. US 2012/0280904, filed Jan. 17, 2012, and entitled "Method For Detecting Gestures Using a Multi-Segment Photodiode and One or Fewer Illumination Sources", and the co-owned and co-pending U.S. Patent Application Pub. No. 2012/0280107, filed Nov. 25, 2011, and entitled "Optical Gesture Sensor Using a Single Illumination Source" which are herein incorporated in their entireties by reference. In further embodiments, the sensors 202 implemented in the system 200 can be any one of a number of other types of optical sensors (e.g., gesture sensors, gesture sensing devices), such as any one of the other gesture sensing devices described in the co-owned and co-pending U.S. Patent Application Pub. No. US 2012/0280904, filed Jan. 17, 2012, and entitled "Method For Detecting Gestures Using a Multi-Segment Photodiode and One or Fewer Illumination Sources", and the co-owned and co-pending U.S. Patent Application Pub. No. 2012/0280107, filed Nov. 25, 2011, and entitled "Optical Gesture Sensor Using a Single Illumination Source". In further embodiments, the sensors 202 implemented in the system 200 described herein can be any gesture sensing device (e.g., gesture sensor, optical sensor).

In the illustrated embodiment, the plurality of sensors 202 implemented by the system 200 includes four sensors 202. In alternative embodiments, the plurality of sensors 202 may include a different number of (e.g., more than four, fewer than four) sensors 202. In embodiments, each sensor 202 included in the plurality of sensors 202 is located (e.g. oriented) at a fixed location within or on the system (e.g., device) 200. For example, the sensors 202 may be placed at fixed locations proximate to a display screen of the system (e.g., device) 200. In embodiments, it is contemplated that the number of sensors 202 implemented by the system 200 can be directly proportional to the number of gestures the system 200 is able to detect, so more sensors 202 may be used for expanding the gesture detection capabilities of the system 200.

In embodiments, the system 200 further includes a processor (e.g., a central processor) 204 which is connected to each sensor included in the plurality of sensors 202 of the system 200. The processor 204 provides processing functionality for the system 200 and can include any number of processors, micro-controllers, or other processing systems and resident or external memory for storing data and other information accessed or generated by the system 200. The processor 204 can execute one or more software programs that implement techniques described herein. The processor 204 is not limited by the materials from which it is formed or the processing mechanisms employed therein and, as such, can be implemented via semiconductor(s) and/or transistors (e.g., using electronic integrated circuit (IC) components), and so forth.

In embodiments, the sensors 202 are configured for sensing (e.g., detecting) gestures made by the target (e.g., a moving hand). For example, each sensor 202 is configured for sensing (e.g., detecting) simple gestures (e.g., simple movements, simple three-dimensional (3-D) gestures, sub-gestures), which can include, but are not limited to: a left-to-right gesture (e.g., a left-to-right hand swipe), a right-to-left gesture, an up-to-down gesture, a down-to-up gesture, an in-to-out gesture, an out-to-in gesture and a clicking gesture. In embodiments, the gestures are touch-free in that the gestures are sensed (e.g., detected) by the sensors 202 without the target (e.g., the source of the gestures) physically contacting the sensors 202. In embodiments, the sensors 202 are further configured for generating signals based upon the sensed (e.g., detected) gestures. In embodiments, the sensors 202 are further configured for transmitting the signals to the processor 204.

In embodiments, the processor 204 is configured for receiving the signals transmitted by the sensors 202. In embodiments, the processor 204 is configured for processing the signals received from the sensors 202 to derive gesture data from the signals. In embodiments, the processor 204 is configured for collectively processing and analyzing the signals (and the gesture data) corresponding to sub-gestures received (e.g., detected by) the sensors 202 of the array to determine whether a complex gesture has been sensed (e.g., detected, received) by the array of sensors 202 and, if so, what type of complex gesture has been sensed by the array of sensors 202. In embodiments, a complex gesture (e.g., gesture) is a gesture derived from a combination of simple gestures (e.g., sub-gestures). For example, complex gestures can include, but are not limited to, an erase gesture, a pinch gesture, a stretch gesture, a clockwise rotate gesture, and a counterclockwise rotate gesture. In embodiments, a complex gesture can have a meaning which is different from the meanings of the individual simple gestures from which the complex gesture is derived. For example, a complex gesture, such as an erase gesture, can be derived from a combination of individual simple gestures, such as a left-to-right gesture, followed by a right-to-left gesture.

In embodiments, processing functionality of the processor 204 can be implemented via a software program running (e.g., executing) on the processor 204. In embodiments, the software program can implement one or more algorithms. In embodiments, the system 200 includes memory 206 (e.g., digital memory). In embodiments, the memory 206 is connected to (e.g., accessible by) the processor 204 and is configured for storing data. The memory 206 is an example of tangible computer-readable storage medium that provides storage functionality to store various data associated with operation of the system 200, such as software programs and/or code segments, or other data to instruct the processor 204 to perform the steps described herein. Although a single memory 206 is shown, a wide variety of types and combinations of memory can be employed. The memory 206 can be integral with the processor 204, can comprise stand-alone memory, or can be a combination of both. The memory 206 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, and so forth. In embodiments, the memory 206 can include removable integrated circuit card (ICC) memory, such as memory provided by a subscriber identity module (SIM) card, a universal subscriber identity module (USIM) card, a universal integrated circuit card (UICC), and so on.

In embodiments, the memory 206 is configured for storing data which provides information about the relative locations of all sensors 202 of the system 200. In embodiments, the memory 206 is configured for storing one or more lookup tables and/or sequence trees. For example, the lookup tables and/or sequence trees can include pre-determined potential combinations and/or sequences of sub-gestures (e.g., simple gestures) which may be detected by the sensors 202 of the system 200 and the corresponding gestures (e.g., complex gestures), if any, associated with (e.g., defined by or indicated by) those respective combinations and/or sequences. The processor 204 is configured for utilizing (e.g., referencing) the lookup tables and/or sequence trees for promoting the ability of the system 200 to: i) determine if a complex gesture has been detected by the system 200 and; ii) if so, define the type of complex gesture detected by the system 200.

As mentioned above, the processor 204 is configured for collectively processing and analyzing the signals (and the gesture data) corresponding to sub-gestures received (e.g., detected) by the sensors 202 of the array to determine whether a complex gesture has been sensed (e.g., detected, received) by the array of sensors 202 and, if so, what type of complex gesture has been sensed by the array of sensors 202. The system 200 is configured for carrying out this processing in any one or more of a variety of ways as will be discussed below.

Figure 3:
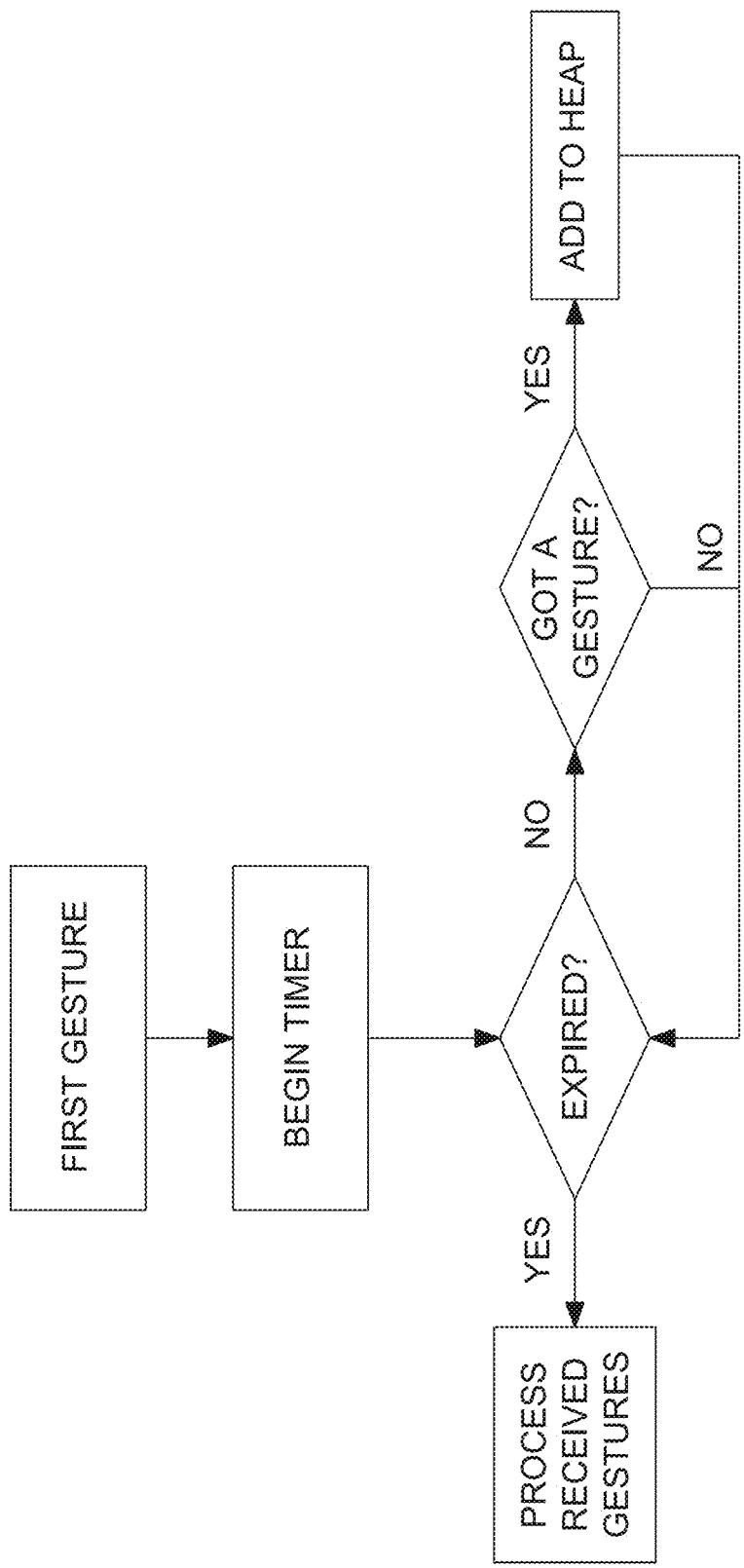
FIG. 3 is an exemplary flow diagram for a sub-gesture collection and sub-gesture data processing sequence in accordance with an exemplary embodiment of the present disclosure.

In some embodiments, the system 200 is configured for starting a countdown timer when a sub-gesture (e.g., simple gesture) is received on (e.g., detected by) any of the sensors (e.g., sensors 1-4) 202 of the system 200. For example, the duration of the countdown timer can be less than 500 milliseconds. The starting of the countdown timer commences a data frame for the system 200, which ends when the countdown timer expires. During the data frame, sub-gestures (e.g., simple gestures) can be received (e.g., detected) by the sensors 202. After the data frame expires, the processor 204 then collectively processes and analyzes the signals (and the gesture data) corresponding to the sub-gestures which were received (e.g., detected) by the sensors 202 of the array during the data frame to determine whether a complex gesture has been sensed (e.g., detected, received) by the array of sensors 202 and, if so, what type of complex gesture has been sensed by the array of sensors 202. FIG. 3 (FIG. 3) illustrates an exemplary flow diagram for the above-described gesture (e.g., sub-gesture) collection and gesture data processing sequence.

As mentioned above, when processing and analyzing the gesture data (e.g., sub-gesture data) to determine whether a complex gesture has been sensed (e.g., detected) by the array of sensors 202, the processor 204 can access a lookup table. FIGS. 4A-4D (FIGS. 4A-4D) illustrate examples of lookup tables which may be implemented by the system 200 shown in FIG. 2. FIG. 4A depicts a table which provides a series of sub-gesture combinations which, if received by the sensors specified in the table, would define a complex gesture (e.g., a stretch gesture). For example, the first entry in the table of FIG. 4A indicates that if no simple gestures (e.g., sub-gestures) were received by sensors 1 and 2, a down-to-up sub-gesture was received by sensor 3, and a left-to-right sub-gesture was received by sensor 4, such a sequence of sub-gestures would be collectively interpreted (e.g., detected) as a complex gesture (e.g., a stretch gesture). Further, the last entry in the table of FIG. 4A indicates that if a right-to-left sub-gesture was received by sensor 1, no sub-gesture was received by sensor 2, and a left-to-right sub-gesture was received by sensor 4, regardless of what sub-gesture was received by sensor 3, the sequence of sub-gestures would be collectively interpreted (e.g., detected) as a stretch gesture. FIGS. 4B through 4D depict tables which provide sub-gesture combinations which, if received by the sensors specified in the tables, would define other complex gestures including a pinch gesture (FIG. 4B), a rotate clockwise gesture (FIG. 4C), and a rotate counter-clockwise gesture (FIG. 4D). Referring to the first entry in the table depicted in FIG. 4B, if no sub-gestures are received (e.g., detected) by sensors 1 and 2, a left-to-right sub-gesture is received by sensor 3 and a right-to-left sub-gesture is received by sensor 4, the sequence of sub-gestures would be collectively interpreted (e.g., detected) as a complex gesture (e.g., a pinch gesture). For reference purposes, the arrows in the tables shown in FIGS. 4A-4D indicate the direction of motion of the sub-gesture received by that sensor, while an "X" indicates an inconsequential sub-gesture, such that it doesn't matter what sub-gesture is received by that sensor, the combination will still be collectively interpreted as a complex gesture. Further, in the tables shown in FIGS. 4A-4D the quotation mark indicates that no gesture was received by that sensor. For example, in the second entry of FIG. 4A, no gesture was received by sensors 1 and 2.

FIG. 4E (FIG. 4E) depicts another lookup table which provides possible combinations of sub-gestures (e.g., simple gestures) which can be received by the sensors, and whether or not the combinations would result in the combination of simple gestures being interpreted as a complex gesture (e.g., whether or not a complex gesture would be detected) by the system 200 shown in FIG. 2. For example, the second entry in the table of FIG. 4E depicts a combination of received sub-gestures in which no sub-gesture was received by sensor 1, an up-to-down sub-gesture was received by sensor 2, a left-to-right sub-gesture was received by sensor 3 and a right-to-left sub-gesture was received by sensor 4. The combination of sub-gestures received by sensors 3 and 4 would normally be interpreted as a pinch gesture. However, because there is another (e.g., an extra) sub-gesture present (e.g., the sub-gesture received by sensor 2) which, when combined with the other received sub-gestures, does not fit (e.g., match) a pre-determined combination of sub-gestures that defines a complex gesture, the system 200 interprets (e.g., treats) this as no gesture being detected by the system 200.

As mentioned above, after the data frame expires, the processor 204 collectively processes and analyzes the signals (and the gesture data) corresponding to the sub-gestures which were received (e.g., detected) by the sensors 202 of the array during the data frame to determine whether a complex gesture has been sensed (e.g., detected, received) by the array of sensors 202 and, if so, what type of complex gesture has been sensed by the array of sensors 202. In embodiments, if just the initial isolated sub-gesture (e.g., the sub-gesture that triggered the countdown timer) was received, and no other sub-gestures were received by any of the sensors 202 within the data frame, the system 200 would interpret (e.g., treat) this as no gesture being detected by the system 200. Examples of this scenario are depicted in the fourth and fifth entries of the table shown in FIG. 4E.

In other embodiments, when processing and analyzing the gesture data (e.g., sub-gesture data) to determine whether a complex gesture has been sensed (e.g., detected) by the array of sensors 202, the processor 204 can access a sequence tree, as mentioned above. The sequence tree can include pre-determined sequences of sub-gestures (e.g., simple gestures) and the corresponding gestures (e.g., complex gestures) associated with (e.g., defined by) those sub-gesture sequences. For the case where there are N types of simple gestures (e.g., sub-gestures) available, there can be N sequence trees defining gesture sequences that can be traversed. These N sequence trees can be a set of defined trees which are traversed based upon the sub-gestures received by the system 200. For example, the first node of the sequence tree can correspond to the first sub-gesture received, with each subsequent node of the sequence tree being a specific gesture (e.g., a simple gesture or a complex gesture) which can be sensed (e.g., detected) by one or more of the sensors 202. In embodiments, when a goal node of the tree is reached (e.g., a node corresponding to a last sub-gesture in a valid, pre-defined sequence of sub-gestures defining a complex gesture, the system 200 detects the complex gesture. In embodiments, multiple sequence trees can be merged into a single tree for the sake of efficiency. The strength of the sequence tree approach is that it is based upon the activity-start, activity-stop paradigm and is also recursive, meaning that it is possible to stop and re-start sequences easily.

FIG. 5A (FIG. 5A) depicts an example of a sequence tree, such as described above. For example, assuming the system 200 shown in FIG. 2 is being utilized, FIG. 5A illustrates that if a left-to-right sub-gesture is received by sensor 3 (sub-gesture "3R") followed by a right-to-left sub-gesture being received by sensor 4 (sub-gesture "4L"), then the combination is interpreted by the system 200 as a complex gesture (e.g., a pinch gesture). Further, FIG. 5A illustrates that if a left-to-right sub-gesture is received by sensor 3 (sub-gesture "3R"), followed by a left-to-right sub-gesture being received by sensor 4 (sub-gesture "4R"), then the combination is interpreted as a sweep right gesture. Further, FIG. 5A illustrates that if a left-to-right sub-gesture is received by sensor 3 (sub-gesture "3R"), followed by a left-to-right sub-gesture being received by sensor 4 (sub-gesture "4R"), followed by a down-to-up sub-gesture being received by sensor 2 (sub-gesture "2U"), then the combination is interpreted as an L gesture. Further, FIG. 5A illustrates that if a left-to-right sub-gesture is received by sensor 4 (sub-gesture "4R"), followed by a right-to-left sub-gesture being received by sensor 3 (sub-gesture "3L"), then the combination is interpreted as a stretch gesture. Still further, FIG. 5A illustrates how some combinations of sub-gestures received by the system 200 may be determined as not defining complex gestures. For example, if a left-to-right sub-gesture is received by sensor 4 (sub-gesture "4R") and a down-to-up sub-gesture is received by sensor 2 (sub-gesture "2U"), this combination of sub-gestures is interpreted by the system 200 as not defining a complex gesture, and so the system 200 treats this combination as though no gesture was detected by the system 200.

In some embodiments, the system 200 can implement a hybrid approach in which the sequence tree is used in combination with the countdown timer. This hybrid approach combines the start-stop activity paradigm with the countdown timer to allow timeouts to cease detection and force processing of data after a given amount of time has expired. In such embodiments, if just the initial isolated sub-gesture (e.g., the sub-gesture that triggered the countdown timer) was received, and no other sub-gestures were received by any of the sensors 202 within the data frame, the system 200 would interpret this as no gesture being detected by the system 200. However, if at the end of a data frame, a last sub-gesture included in the sequence of sub-gestures received within the data frame corresponds to a terminating node of the sequence tree, this is an indication that an entire, correct sequence of sub-gestures corresponding to a complex gesture have been received and the system 200 will detect the complex gesture. FIG. 5B (FIG. 5B) illustrates valid combinations of sub-gestures which, if received, will be interpreted as complex gestures, such as a pinch gesture or a stretch gesture.

Example Complex Gesture Determination Processes

FIGS. 6A and 6B (FIGS. 6A and 6B) depict a flowchart illustrating an example process (e.g., method) for gesture determination via a system (e.g., electronic device) in accordance with an exemplary embodiment of the present disclosure. In embodiments, the method 600 is performed by a system (e.g., electronic device, gesture sensing system), such as the system 200 described above. In embodiments, the method 600 includes the step of detecting (e.g., sensing) a plurality of sub-gestures (e.g., simple gestures) via a plurality of gesture sensors 202 of the system (Step 602). For example, the plurality of sub-gestures is provided by a moving target located proximate to the electronic system 200.

In embodiments, the method 600 further includes the step of generating a plurality of signals via the plurality of sensors 202, the plurality of signals being based on the plurality of sub-gestures (Step 604). In embodiments, the method 600 further includes the step of transmitting the plurality of signals via the plurality of sensors 202 to a processor 204 of the system (Step 606). In embodiments, the method 600 further includes the step of processing the plurality of signals via the processor 204 to obtain sub-gesture data associated with the plurality of sub-gestures (Step 608). For example, the processor 204 of the system 200 processes the signals to determine which simple gestures were received (e.g., detected) by the sensors 202.

In embodiments, the method 600 further includes the step of analyzing the sub-gesture data associated with the plurality of sub-gestures via the processor 204 to determine if the plurality of sub-gestures (e.g., simple gestures) collectively constitute a gesture (e.g., complex gesture) (Step 610). For example, the processor 204 analyzes the plurality of simple gestures and determines if they collectively constitute a complex gesture. In some embodiments, the analyzing step can include a step of comparing the sub-gesture data to a lookup table and when the sub-gesture data corresponds to a pre-determined sub-gesture combination in the table which is associated with a complex gesture, classifying the plurality of received sub-gestures as the complex gesture (Step 610a). For example, the lookup table can include a plurality of possible pre-determined sub-gesture combinations corresponding to gestures (e.g., complex gestures). In other embodiments, the analyzing step can include a step of comparing the sub-gesture data to a sequence tree and when the sub-gesture data corresponds to a pre-determined sub-gesture sequence of the sequence tree which is associated with a complex gesture, classifying the plurality of received sub-gestures as the complex gesture (Step 610b). For example, the sequence tree can indicate a plurality of possible pre-determined sub-gesture sequences corresponding to gestures (e.g., complex gestures).

In embodiments, when analyzing the sub-gesture data associated with the plurality of sub-gestures indicates that the plurality of sub-gestures collectively constitute a gesture, interpreting the plurality of sub-gestures as a detected gesture (Step 612). For example, when analysis of the sub-gesture data indicates that a combination and/or sequence of sub-gestures has been received which is associated with (e.g., defines) a complex gesture, the system 200 detects the complex gesture.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for gesture determination via an electronic system, the method comprising:
    detecting a plurality of sub-gestures via a plurality of sensors of the electronic system;
    when a first sub-gesture included in the plurality of sub-gestures is detected, commencing a data frame for the system, the data frame having a pre-determined, finite duration;
    generating a plurality of signals via the plurality of sensors, the plurality of signals being based on the plurality of sub-gestures;
    transmitting the plurality of signals via the plurality of sensors to a processor of the system;
    processing the plurality of signals via the processor to obtain sub-gesture data associated with the plurality of sub-gestures; and
    analyzing the sub-gesture data associated with the plurality of sub-gestures via the processor to determine if the plurality of sub-gestures collectively constitute a gesture,
    wherein analyzing the sub-gesture data is performed after the data frame expires by analyzing the sub-gesture data corresponding to: the first sub-gesture and to sub-gestures detected during the data frame.

2. The method as claimed in claim 1, further comprising:
    when analyzing the sub-gesture data associated with the plurality of sub-gestures indicates that the plurality of sub-gestures collectively constitute a gesture, interpreting the plurality of sub-gestures as a detected gesture.

3. The method as claimed in claim 1, wherein commencing the data frame for the system includes starting a countdown timer.

4. The method as claimed in claim 2, wherein analyzing the sub-gesture data includes:
    comparing the sub-gesture data to a lookup table, the lookup table including a pre-determined sub-gesture combination corresponding to the gesture.

5. The method as claimed in claim 2, wherein analyzing the sub-gesture data associated with the plurality of sub-gestures includes:
comparing the sub-gesture data to a sequence tree, the sequence tree indicating a pre-determined sub-gesture sequence corresponding to the gesture.

6. The method as claimed in claim 4, further comprising:
when the sub-gesture data corresponds to the pre-determined sub-gesture combination in the table, classifying the plurality of received sub-gestures as the gesture.

7. The method as claimed in claim 5, further comprising:
when the sub-gesture data indicates that the plurality of received sub-gestures corresponds to the pre-determined sub-gesture sequence, classifying the plurality of received sub-gestures as the gesture.

8. A computer-implemented method for gesture determination, the computer-implemented method comprising:
detecting a plurality of sub-gestures;
when a first sub-gesture included in the plurality of sub-gestures is detected, commencing the data frame, the data frame having a pre-determined, finite duration;
generating a plurality of signals based on the plurality of detected sub-gestures;
causing a processor to process the plurality of signals to obtain sub-gesture data associated with the plurality of sub-gestures;
causing the processor to analyze the sub-gesture data associated with the plurality of sub-gestures to determine if the plurality of sub-gestures collectively constitute a gesture, wherein analyzing the sub-gesture data is performed after the data frame expires by analyzing the sub-gesture data corresponding to: the first sub-gesture and to sub-gestures detected during the data frame; and
when analyzing the sub-gesture data associated with the plurality of sub-gestures indicates that the plurality of sub-gestures collectively constitute the gesture, detecting the gesture.

9. The computer-implemented method as claimed in claim 8, wherein the sub-gestures have a first level of complexity and the gesture has a second level of complexity which is greater than the first level of complexity.

10. The computer-implemented method as claimed in claim 8, wherein commencing the data frame includes starting a countdown timer.

11. The computer-implemented method as claimed in claim 8, wherein analyzing the sub-gesture data includes:
comparing the sub-gesture data to a lookup table, the lookup table including a pre-determined sub-gesture combination corresponding to the gesture.

12. The computer-implemented method as claimed in claim 8, wherein analyzing the sub-gesture data associated with the plurality of sub-gestures includes:
comparing the sub-gesture data to a sequence tree, the sequence tree indicating a pre-determined sub-gesture sequence corresponding to the gesture.

13. The computer-implemented method as claimed in claim 12, further comprising:
when the sub-gesture data corresponds to the pre-determined sub-gesture combination in the table, classifying the plurality of received sub-gestures as the gesture.

14. The computer-implemented method as claimed in claim 13, further comprising:
when the sub-gesture data indicates that the plurality of received sub-gestures corresponds to the pre-determined sub-gesture sequence, classifying the plurality of received sub-gestures as the gesture.

15. An electronic system, comprising:
a plurality of sensors configured to generate and transmit a plurality of signals based on a plurality of sub-gestures detected by the plurality of sensors;
a processor connected to the plurality of sensors and configured to receive the plurality of signals transmitted by the plurality of sensors; and
a memory communicatively coupled with the processor, the memory having computer executable instructions stored thereon, the computer executable instructions, when executed by the processor, causing the processor to: process the plurality of signals to obtain sub-gesture data associated with the plurality of sub-gestures; when a first sub-gesture included in the plurality of sub-gestures is detected, commence a data frame, the data frame having a predetermined, finite duration; analyze the sub-gesture data associated with the plurality of sub-gestures to determine if the plurality of sub-gestures collectively constitute a gesture, wherein the sub-gesture data is analyzed after the data frame expires by analysis of the sub-gesture data corresponding to the first sub-gesture and to sub-gestures detected during the data frame; and detecting the gesture when analysis of the sub-gesture data indicates that plurality of sub-gestures collectively constitute the gesture.

16. The electronic system as claimed in claim 15, wherein the plurality of sensors are optical sensors.

* * * * *